(12) United States Patent
Ohnishi et al.

(10) Patent No.: US 6,242,737 B1
(45) Date of Patent: Jun. 5, 2001

(54) MICROSCOPIC SYSTEM EQUIPT WITH AN ELECTRON MICROSCOPE AND A SCANNING PROBE MICROSCOPE

(75) Inventors: Hideaki Ohnishi, Akishima; Yukihito Kondo, 1-19-207, Midori-cho 3-chome, Akishima, Tokyo; Kunio Takayanagi, Kawasaki, all of (JP)

(73) Assignees: Japan Science and Technology Corporation, Saitama-ken; Yukihito Kondo, Akishima, both of (JP)

( * ) Notice: Subject to any disclaimer, the term of this patent is extended or adjusted under 35 U.S.C. 154(b) by 0 days.

(21) Appl. No.: 09/136,730

(22) Filed: Aug. 19, 1998

(30) Foreign Application Priority Data

Aug. 21, 1997 (JP) .................................... 9-239139

(51) Int. Cl.[7] .............................. G01N 13/12; G21K 5/10
(52) U.S. Cl. .................... 250/306; 250/23 F; 250/442.11
(58) Field of Search .................................. 250/306, 307, 250/423 F, 442.11

(56) References Cited

U.S. PATENT DOCUMENTS

| | | | |
|---|---|---|---|
| 5,061,850 | * 10/1991 | Kelly et al. | ............................ 250/306 |
| 5,229,607 | * 7/1993 | Matsui et al. | ...................... 250/396 R |
| 5,455,420 | 10/1995 | Ho et al. | ............................... 250/306 |
| 5,705,814 | * 1/1998 | Young et al. | .......................... 250/306 |

OTHER PUBLICATIONS

Memmert U et al: "Combined Ultrahigh Vacuum Scanning Tunneling Microscope Scanning Electron Microscope System" Review of Scientific Instruments, vol. 67, No. 6, Jun. 1, 1996, pp. 2269–2273.

Ehrichs E E et al: "A Scanning Tunneling Microscope/ Scanning Electron Microscope System for the Fabrication of Nanostructures" Journal of Vacuum Science and Technology; Part B, vol. 9, No. 2 Part 02, Mar. 1, 1991.

Lo W K et al: "Investigation of STM image artifacts by in–situ reflection electron microscopy" Reflection Electron Microscopy; Invited Papers from a Symp. at 5th Conf. Beijing, China, Aug. 1–6, 1992; Ultramicroscopy vol. 48.

* cited by examiner

Primary Examiner—Bruce C. Anderson

(57) ABSTRACT

The present invention is to provide a microscopic system by which a simultaneous observation at an ultra high vacuum condition by an electron microscope and by a scanning probe microscope is possible in an ultra high vacuum electron microscope chamber 9 equipped with an observation stage 3, to which an ultra high vacuum chamber 1 for a scanning probe microscope equipping with a scanning probe microscope holder 2 in which scanning probe microscope is contained and a specimen treatment chamber 5 possessing a specimen holder 4 on which a specimen is held are connected. Said each chamber of microscopic system can be separately exhausted to the ultra high vacuum level and the specimen holder and the scanning probe microscope holder can voluntarily be fixed to said observation stage and be removed from said observation stage.

3 Claims, 8 Drawing Sheets

MICROSCOPIC SYSTEM EQUIPT WITH AN ELECTRON MICROSCOPE AND A SCANNING PROBE MICROSCOPE

BACK GROUND OF THE INVENTION

The present invention relates to a microscopic system which can combine an electron microscope and a scanning probe microscope, especially a scanning tunneling microscope, by which it becomes possible to make a simultaneous observation of a specimen by mentioned two different types of microscope in ultra high vacuum condition.

DESCRIPTION OF THE PRIOR ART

In general, as a method to install a scanning tunneling microscope (hereinafter, shortened to STM), the method disclosed in Ultra microscopy 48 (1993) 433 to 444 is well-known.

The conventional microscopic system which observes a specimen simultaneously by electron microscope and scanning tunneling microscope is shown in FIG. 2. As clearly understood from FIG. 2, the system has a construction which is characterized by a specimen holder H and a scanning tunneling microscope M in one body in a cylindrical electron microscope holder 17 having a window (WD1) which allows an electronic beam to pass through and a window (WD2) which picks up an electronic beam from a specimen to be observed (SA). And the said microscopic system is also characterized by being attachable to an adequate holding means to insert it in and to remove it from the vacuum chamber. For the observation of a specimen by said two microscopes, after the specimen to be observed SA is set to the specimen holder H, said microscopic system is inserted into a vacuum chamber and fixed, then the specimen and probe 12 of the scanning tunneling microscope are cleaned up by vacuuming the inside of the chamber. However, from the view point of the structural feature of this system, an observation of the specimen which has a clean surface is difficult because the specimen is exposed to the atmosphere. Further in this system, since the cleaning up of the probe of the scanning tunneling microscope and the specimen are carried out at the same time, it is difficult to clean up both two to the desired clean level. And further, it is very difficult to obtain an ultra high vacuum condition.

In FIG. 2, the inspection method of the surface of the specimen by said microscopic system is illustrated as follows. That is, the accelerated electronic beam S is irradiated to the surface of specimen through the window WD1, the reflected electric beam R from the surface of specimen passes through window WD2 and the surface of the specimen is observed. meanwhile, the scanning tunneling microscope scans the surface of the specimen by means of probe 12 and inspects the surface of specimen by observing a tunneling electric current.

In general, for the observation of a specimen by an electron microscope and a scanning probe microscope (hereinafter shortened to SPM) represented by a scanning tunneling microscope, it is required to keep high vacuum condition to protect the contamination of the surface of specimen. Further, the probe of scanning probe microscope should be always kept clean. To obtain an accurate scanning probe microscopic image, it is necessary to satisfy the above mentioned two items. Meanwhile, the cleaning conditions which are set up for a probe of scanning probe microscope and for a specimen are different, and if it is necessary to unify the condition, the starting materials of a probe and a kind of specimen must be restricted. Further, as illustrated in the description of the prior art, when considering a case in which a probe and a specimen are combined in one body, the surface of the specimen is contaminated at the cleaning process of the probe, and on the contrary the probe is contaminated at the cleaning process of the specimen. Therefore, it is necessary for both specimen and probe to be cleaned up at the best condition of each, to be maintained at said condition and to be able to be taken out in the atmosphere separately for exchanging.

As an example of the scanning probe microscope except a scanning tunneling microscope, an Atomic Force Microscope (AFM), a Scanning Near-Field Optical Microscope (SNOM), a Scanning Friction Force Microscope (FFM), a Scanning Surface Potential Microscope (SSPM), a Scanning Near-Field Atomic Force Microscope (SNOAM) and a scanning Near-Field Fluorescence Spectroscopy (SNFS) can be mentioned. The theory of these microscopes and construction are well-known. The description referring to the scanning tunneling microscope in this specification and drawings can be applied to the ordinary scanning probe microscope and above mentioned other kind of scanning probe microscope. Therefore, the illustration of the drawing referring to the scanning tunneling microscope must be understood to be related to the ordinary scanning probe microscope and above mentioned other scanning probe microscope.

SUMMARY OF THE INVENTION

The inventors of this invention have combined an electron microscope and a scanning probe microscope so as to make a simultaneous observation by said two different type microscopes possible, and conducted a study to develop a method to clean up a specimen and a probe of the scanning probe microscope under the adequate conditions for each object to be cleaned up even if the conditions for cleaning each of them are different, and accomplished the present invention based on the following knowledge. That is, by connecting independently to an ultra high vacuum electron microscope chamber an ultra high vacuum chamber to which a scanning probe microscope (held to SPM holder) can be inserted and taken out and an ultra high vacuum chamber to which a specimen can be inserted and taken out, makes it possible to clean up the scanning probe microscope and the specimen separately by different conditions.

The object of the present invention is to provide a microscopic system by which a simultaneous observation by an electron microscope and by a scanning probe microscope under ultra high vacuum condition is possible, and the cleaning of a specimen and a probe by different adequate conditions is possible while the chamber of an ultra high vacuum electron microscope is maintained at ultra high vacuum observation condition, and further wherein a specimen and a probe can be changed separately.

The present of this invention is a microscopic system by which the simultaneous observation at an ultra high vacuum condition by an electron microscope and by a scanning probe microscope is possible, and is accomplished by connecting a specimen treatment chamber 5 equipt with a specimen holder 4 on which a specimen is held and an ultra high vacuum chamber 1 for a scanning probe microscope equipt with a scanning probe microscope holder 2 in which scanning probe microscope (SPM) is contained to an ultra high vacuum electron microscope chamber 9 equipt with an observation stage 3. Observation stage 3 is set up to fix said specimen holder 4 on which a specimen is held which is taken out from said specimen treatment chamber 5 and said scanning probe microscope holder 2 in which scanning probe microscope (SPM) is contained which is taken out from said ultra high vacuum chamber 1 for a scanning probe microscope to the observing position of the main body of the scanning probe microscope and is also equipt with a structural function to irradiate an electronic beam for the observation by the electron microscope to the specimen held on said specimen holder and to take out an electronic beam from said specimen. The ultra high vacuum chamber 1 for a scanning probe microscope and the specimen treatment chamber 5 are separately equipt with a means to transfer and to fix the scanning probe microscope holder 2 and the specimen holder 4 to said observation stage 3 further to remove them from said observation stage and take out from the ultra high vacuum electron microscope chamber 9. The present invention in a preferred embodiment is characterized by using as the scanning probe microscope, a scanning tunneling. In a further embodiment of the invention the means to transfer and to fix the scanning probe microscope holder 2 and the specimen holder 4 to the ultra high vacuum electron microscope chamber 9 and to remove them from there are each a transfer rod (TR1 and TR2, respectively) which has a mechanism to maintain the holder.

To the specimen treatment chamber 5, a load lock chamber 8 (LLC) which combined allows the specimen holder 4 to be removed from said specimen treatment chamber while maintaining the inside vacuum state for the exchange of specimen can be preferably connected. Further, to the specimen treatment chamber 5, the transfer rod (TR2) and the transfer rod (TR3) can be preferably set up. The transfer rod (TR2) is used to insert the specimen holder 4 into the ultra high vacuum electron microscope chamber 9, and to transfer the specimen holder 4 from the taking out position of the ultra high vacuum electron microscope chamber to the position of specimen treatment chamber 5 and to transfer said specimen holder to the reverse direction, while transfer rod (TR3) is used to transfer the specimen holder from the specimen treatment chamber to said load lock chamber and to transfer said specimen holder to the reverse direction.

BRIEF DESCRIPTION OF THE DRAWINGS

FIG. 5-1 is a sectional view of the holder 2 of SPM or STM unit which is cut at the surface including center line.

FIG. 5-2 is a side view of SPM or STM unit from the probe 12 side.

FIG. 6-1 is a schematic illustration of the electron beam for electron microscope and the probe of STM closed to the specimen.

FIG. 6-2 is an enlarged view of FIG. 6-1.

Figure 1:
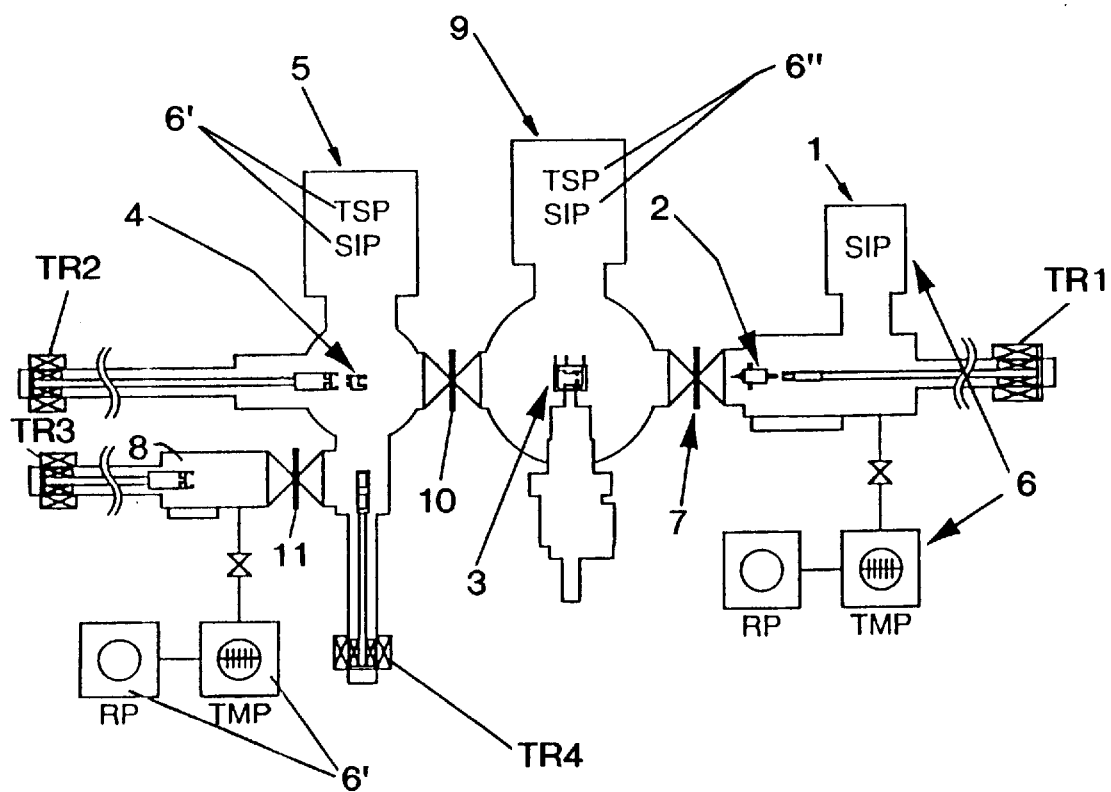
FIG. 1 is a schematic diagram illustrating a microscopic system of this invention which combines an electron microscope and a scanning probe microscope or a scanning tunneling microscope to make a simultaneous observation by mentioned microscopes possible under an ultra high vacuum condition.

In the drawings, each numerical number and mark indicates;

1. Chamber for a scanning probe or a scanning tunneling microscope (SPM or STM)
2. Holder for a scanning probe or a scanning tunneling microscope (SPM or STM)
3. Stage for observation
4. Specimen holder
5. Specimen treatment chamber
6. Ultra high vacuum exhausting system for SPM or STM chamber 1
6'. Ultra high vacuum exhausting system for specimen treatment chamber 5
6". Ultra high vacuum exhausting system for electron microscope chamber 9
7,10,11 valve
8. Load lock chamber (LLC)
9. Electron microscope chamber
12. Probe
13. Cylindrical part of SPM or STM holder
14. Wing (SPM or STM holder)
15. Entrance (observing stage)
16. Leaf spring (observing stage)
17. Electron microscope holder
18. Notch
19. Specimen holder projection
20. Opening for electron beam
21. Driving table
WD: Window
GA: Groove part
H: Specimen arranging part
M: Scanning tunneling microscope
RR: Ruby rod
TR1: Transfer rod for SPM or STM holder
TR2: Transfer rod for specimen holder
TR3: Transfer rod for load lock chamber
TR4: Transfer rod for lifting specimen holder
PJ: Projection (SPM or STM holder)
TH: Tip holding part (SPM or STM holder)
SIP: Sputter ion pump
TMP: Turbo-molecular pump
RP: Rotary pump
TSP: Titanium sublimation pump
TPZT: Tube piezo element
SPZT: Scanning piezo element
MPZT: Piezo element for inertia driving
CW: Counter weight
S: Electron beam for the observation
R: Reflected electron beam
SA: Specimen to be observed
CS: Press coil spring
$e^-$: Observing electron beam

DETAILED DESCRIPTION OF THE INVENTION

Hereinafter the structural features of the present invention will be fully described and illustrated with the aid of in the accompanying drawings. In the illustration, the case which uses a scanning tunneling microscope represented by a scanning probe microscope is mentioned. The theory illustrated below can be applied to other types of scanning probe microscope.

The ultra high vacuum chamber for a scanning tunneling microscope (STM chamber 1) is connected to the ultra high vacuum electron microscope chamber (electron microscope chamber 9). Then the probe 12 of STM contained in STM holder 2 is cleaned up by vacuuming the inside of said STM chamber 1 to an ultra high vacuum level. STM holder 2 is transferred to electron microscope chamber 9 by means of the transfer rod (TR1) for STM holder and said STM holder 2 is moved by the observation stage 3. Further, the specimen is held to the specimen holder 4 located in the specimen treatment chamber 5 which is located adjacent to electron microscope chamber 9 and cleaned up by vacuuming the inside of said specimen treatment chamber 5, then transferred by means of the transfer rod (TR2) and moved to the observation stage 3 as with STM holder 2.

Electron microscope chamber 9 and STM chamber 1 are connected via a valve 7 (gate valve), while, electron microscope chamber 9 and specimen treatment chamber 5 are connected via a valve 10. STM holder 2 and specimen holder 4 can pass through these valve 7 and 10, and these valve must have enough ability to maintain the ultra high vacuum condition of electron microscope chamber 9.

To the STM chamber 1, the ultra high vacuum exhausting system 6 composed by a rotary pump (RP), a turbo molecular pump (TMP) and a sputter ion pump (SIP) and a transfer rod (TR1) which inserts the STM holder 2 into the electron microscope chamber 9 and transfers it from there are set up. The specimen treatment chamber 5 is also equipped with an ultra high vacuum exhausting system 6' composed by a rotary pump (RP), a turbo molecular pump (TMP), a sputter ion pump (SIP) and a titanium sublimation pump (TSP), and a transfer rod (TR2) of the specimen holder 4 which inserts the specimen holder 4 into the electron microscope chamber 9 and transfers it from there. Further, at the bottom of specimen treatment chamber 5, a transfer rod (TR4) which moves the specimen holder 4 up and down is connected. A valve 11 is provided between the chamber housing transfer rod TR4 and the load lock chamber 8 (LLC) which make it possible to insert the specimen holder 4 into or take out it from the specimen treatment chamber 5. Transfer rod (TR3) is provided for the load lock chamber 8 (LLC) to insert and take out the specimen holder 4.

To the electron microscope chamber 9, an ultra high vacuum exhausting system 6" composed by a sputter ion pump (SIP) and a titanium sublimation pump (TSP) and an observation stage 3 to fix the specimen holder 4 and the STM holder to the observation position are set up.

Figure 3:
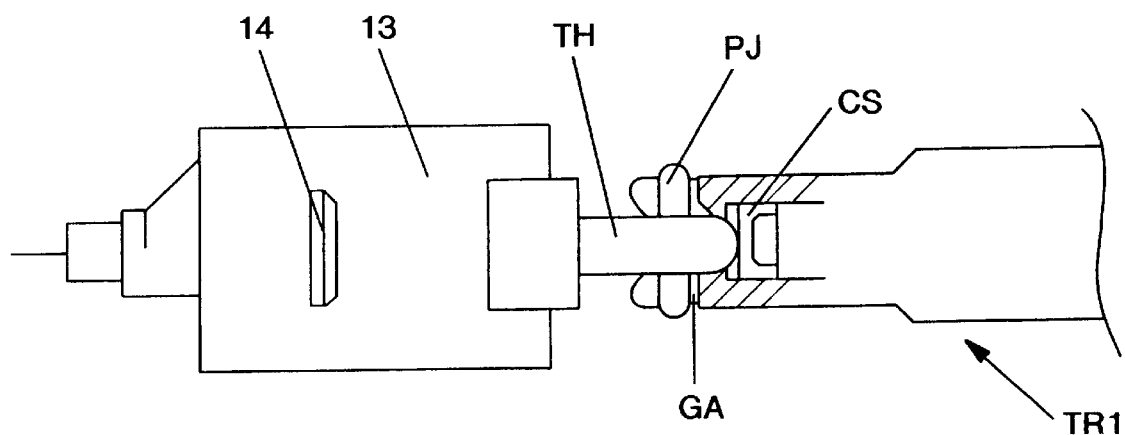
FIG. 3 is a schematic illustration of grasping structure of SPM or STM holder and transfer rod TR1 of said holder.
Figure 4:
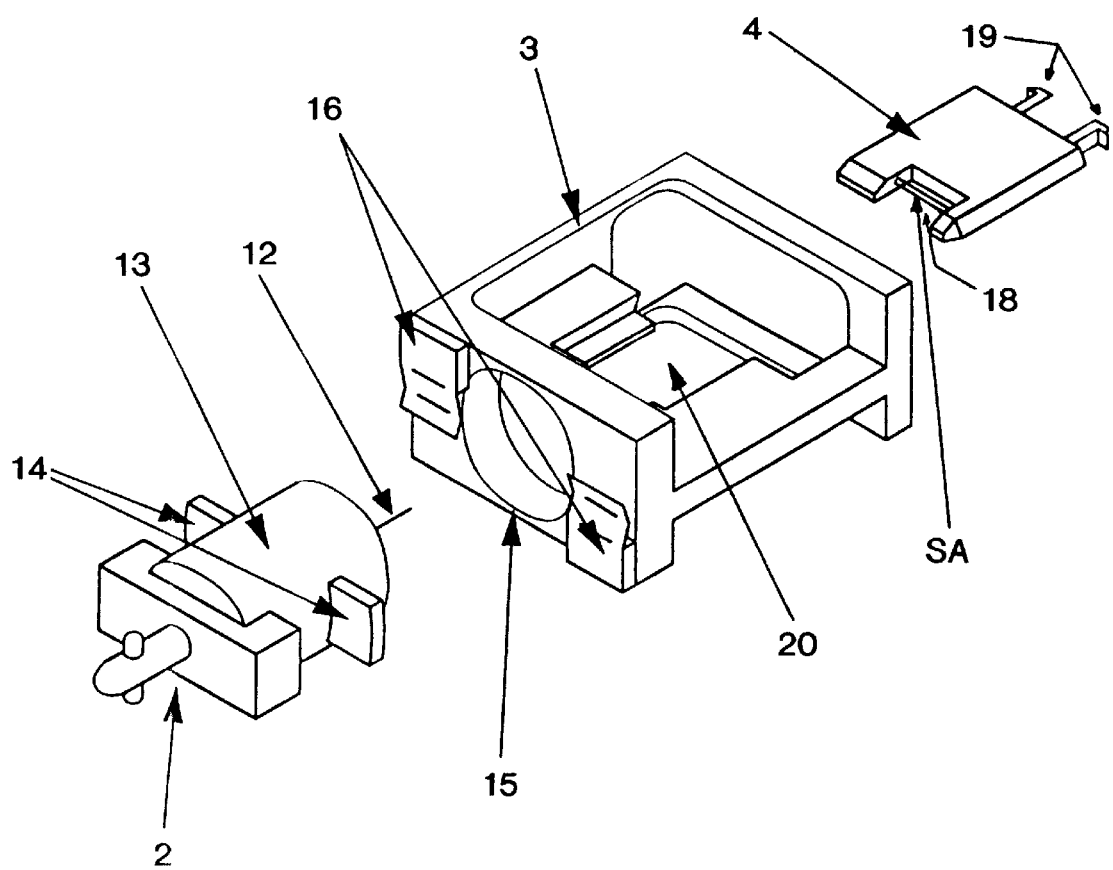
FIG. 4 is a schematic illustration of the structure combining the observing stage 3 with SPM or STM holder 2 and the specimen holder 4.

As shown in FIG. 3, the spearhead of transfer rod (TR1) has a structural feature to maintain the STM holder 2 by grasping the projections (PJ) located on both sides of tip holding part (TH, refer to FIG. 4) of STM holder 2. The spearhead of TR1, includes a groove part (GA) in which PJ is put. When TH is stuck into TR1, it pushes a press coil spring CS located at the spearhead of TR1 (in the drawing, this part is illustrated by perspective view to show the correlation between CS and TH), and this press coil spring pushes back said TH part by a repulsing power. Consequently said PJ part is oppressed to said groove part (GA).

STM holder 2, which is maintained and transferred as illustrated above includes a tip holding part TH, a cylindrical part 13 and wings 14, projecting from both sides of the cylindrical part. Said cylindrical part 13 is inserted into the aperture 15 in one wall in the observation stage 3 until said wings 14 touch to the surface of the wall with the aperture is. After the wings 14 touch to the surface of the aperture for said cylindrical part, STM holder 2 is rotated by rotating TR1, and said wings 14 are slipped in under leaf springs 16, provided on the surface of observation stage 3 with said aperture and are fixed by being oppressed by said leaf springs.

On the whole, the shape of specimen holder 4 is flat and comprises a specimen holder projection 19 to maintain it at the spearhead of TR2, and, at the opposite side of 19, a notch part 18 to which a specimen is set up. Specimen holder 4 is transferred by means of said TR2 and fixed to the observation stage 3, with is located at the position which the specimen faced to probe 12 of STM. Meanwhile, the structure of a specimen holder is not intended to be restricted to the above mentioned structure for maintaining the specimen to be observed as long as the simultaneous observation by a scanning tunneling microscope and an electron microscope is possible.

In a case of a transmission electron microscope, an electron beam for the observation is radiated from the upper portion of electron microscope chamber 9, transmitted to a specimen SA set up to the notch part 18 of said specimen holder 4, passes through an opening 20 for an electron beam and picked out on a fluorescent screen (not shown in drawings) equipped at the lower part of electron microscope chamber.

In a case of a refracting electron microscope, a refracting electron beam can be picked up from the opening 20 for an electron beam same as to said transmission electron microscope by slightly changing a radiation angle of an observation electron beam against the specimen.

Figure 2:
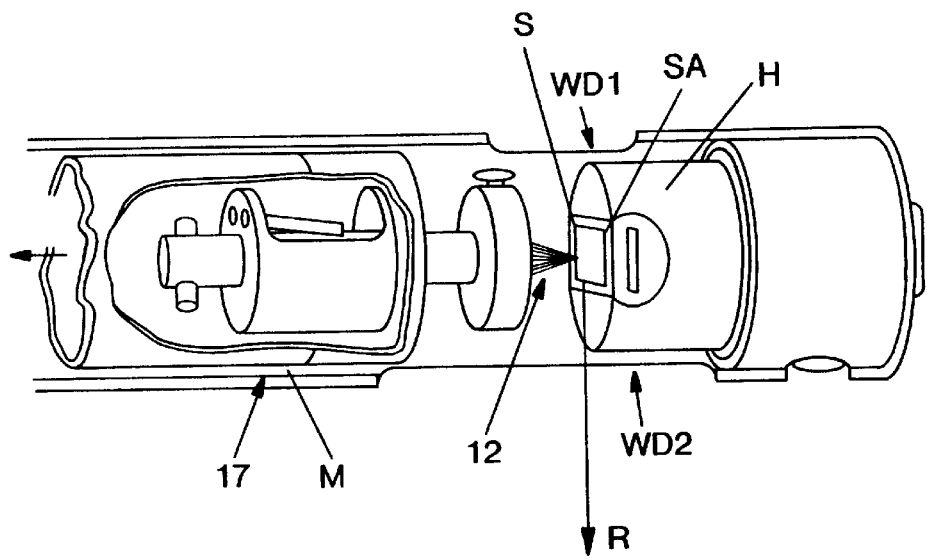
FIG. 2 is a schematic diagram illustrating a microscopic system which combines a conventional electron microscope and a scanning tunneling microscope which makes a simultaneous observation possible.
Figures 1, 5:
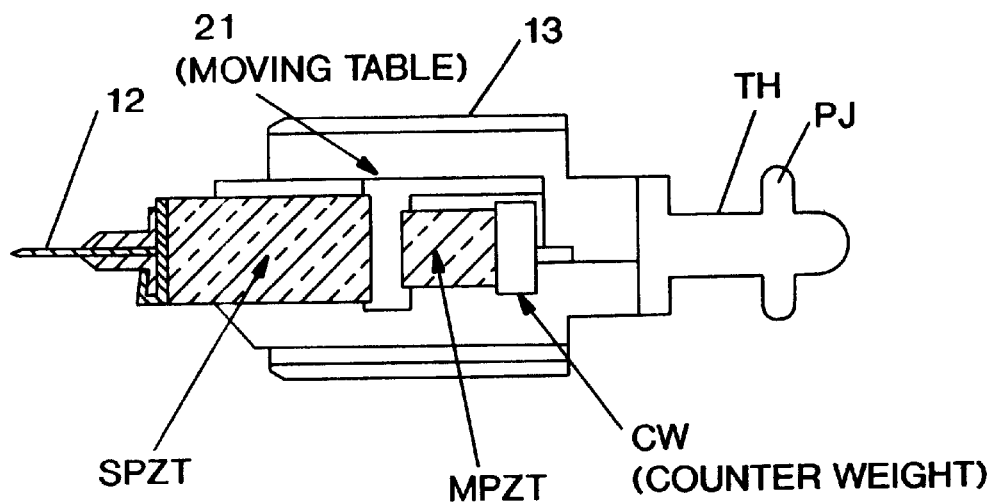
Figures 2, 5:
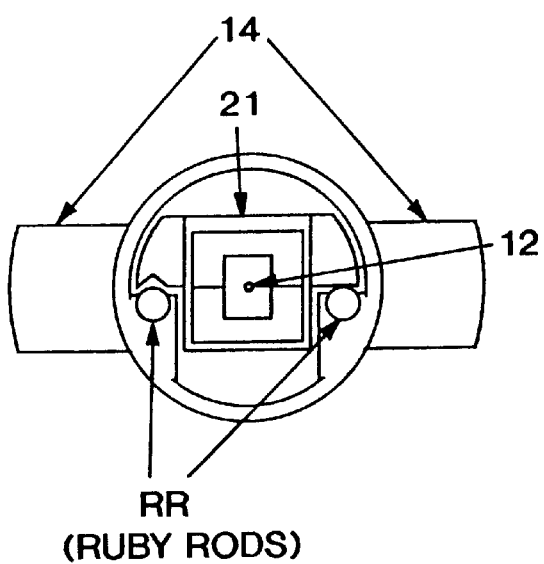

A structural feature of a scanning tunneling microscope and a holder will be understood from the following illustration in connection with the accompanying drawings. FIG. 5-1 is a cross sectional view of STM and STM holder (STM unit) by a vertical line including a center line of a cylindrical part 13, and FIG. 5-2 is a side view of STM unit from probe 12. SPZT is a scanning piezo element which scans the probe 12 to X, Y and Z axis direction. An inertia driving piezo MPZT is an element to locate approximately the probe 12 closely to the observation position of the specimen, while counter weight CW is to act to generate an effective power to move a driving table on which said two piezo elements are set up to the right and left direction by vibration when electron voltage is charged to the inertia driving piezo element.

As clearly shown in FIG. 5-2, the driving table 21 is arranged on two ruby rods RR which are set up to STM holder. One brim of said driving table which contacts to a ruby rod is a surface on which a V groove is engraved and another brim which contacts to another ruby rod is a flat surface, and in this case, the V groove acts as a guide to move the driving table along with the ruby rod, while the flat brim acts to support the driving table smoothly.

Said each piezo element is elastic corresponding with the height of electric voltage charged to the both ends of one crystalline direction, therefore the probe attached to the spearhead can be moved by accuracy of 0.01 nm level. Further, since the resolving power of a microscope is decided by the accuracy of spearhead of probe, the spearhead of probe is processed sharply from both mechanical and chemical view point and the composing material must be a material which can endure to a severe condition. Gold, tungsten or platinum can be used as the starting material of the probe. The positioning of probe is carried out automatically by a computer control system which possesses an apparatus to measure the tunneling current.

DETAILED DESCRIPTION OF THE EXAMPLE

The present invention will be further illustrated in the following Example and accompanying drawings, however, it is to be understood that the invention is not intended to be limited to the Example and accompanying drawings.

EXAMPLE

Electron microscope chamber 9 is ultra highly vacuumed ($2 \times 10^{-8}$ Pa) by means of ultra high vacuum exhausting system 6". STM contained in STM holder 2 is cleaned up in STM chamber 1 inside of which is ultra highly vacuumed ($8 \times 10^{-8}$ Pa) by means of ultra high vacuum exhausting system 6, then transferred to an observation stage 3 in electron microscope chamber 9 through valve 7 by TR1 and fixed. Electric voltage to be charged to a piezo element which controls X, Y and Z axes of STM is supplied by electric cords (not shown in drawings) which extends along with the transportation of STM holder 2 through valve 7.

Electric voltage-transferring distance characteristic of said element is 200 nm/150V to X, Y direction and 600 nm/150V to Z direction.

The specimen to be observed composed by gold vacuum evaporated copper line of 0.2 mm is set up to the notch part 18 of specimen holder 4, and ultra highly vacuumed ($2 \times 10^{-8}$ Pa) by means of ultra high vacuum exhausting system 6' and cleaned up, then transferred and fixed to the observation stage 3 in electron microscope chamber 9 through valve 10 by TR2.

Figures 1, 6:
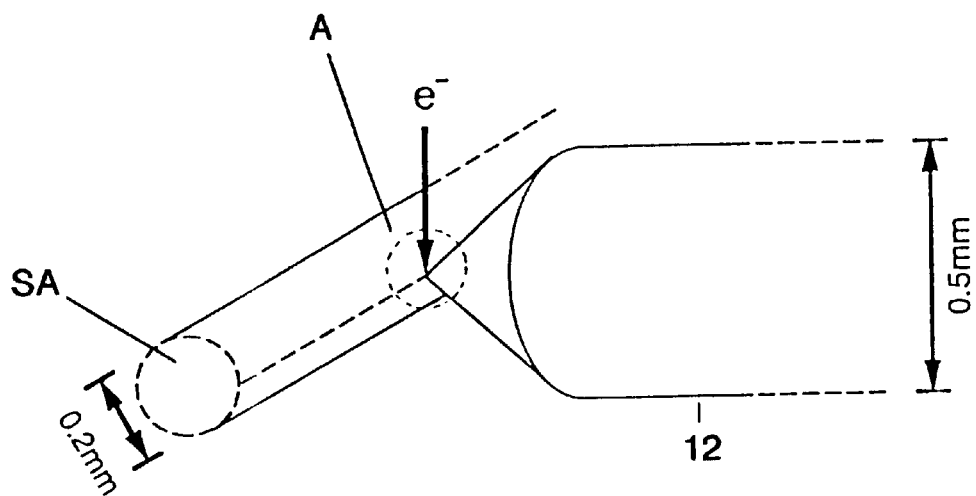
Figures 2, 6:
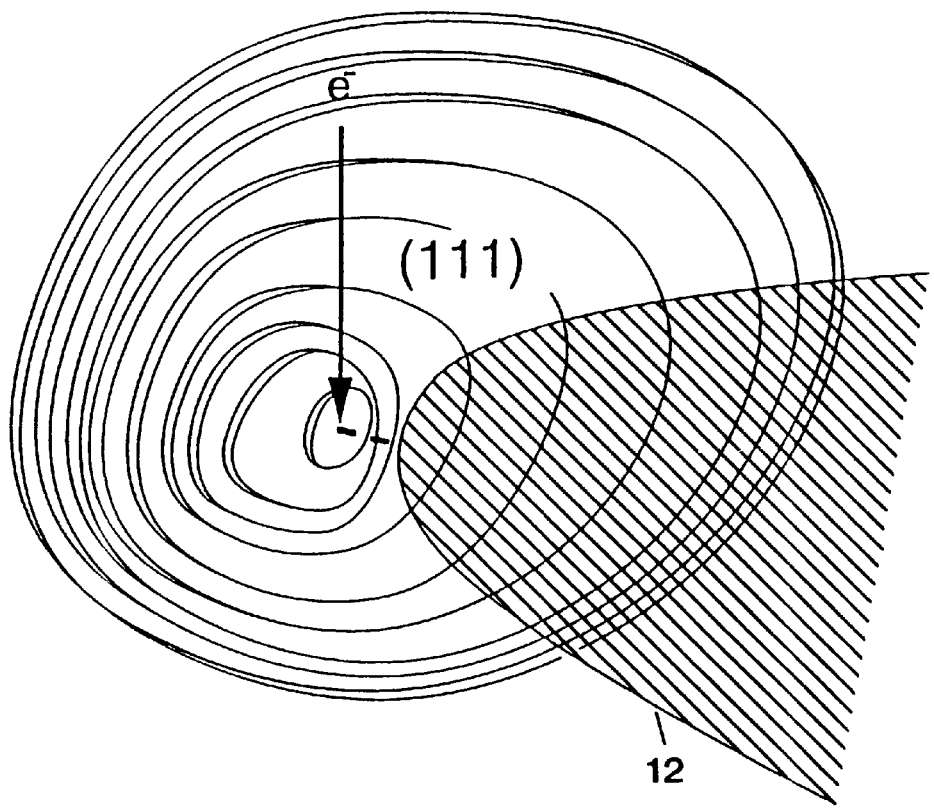
Figure 7:
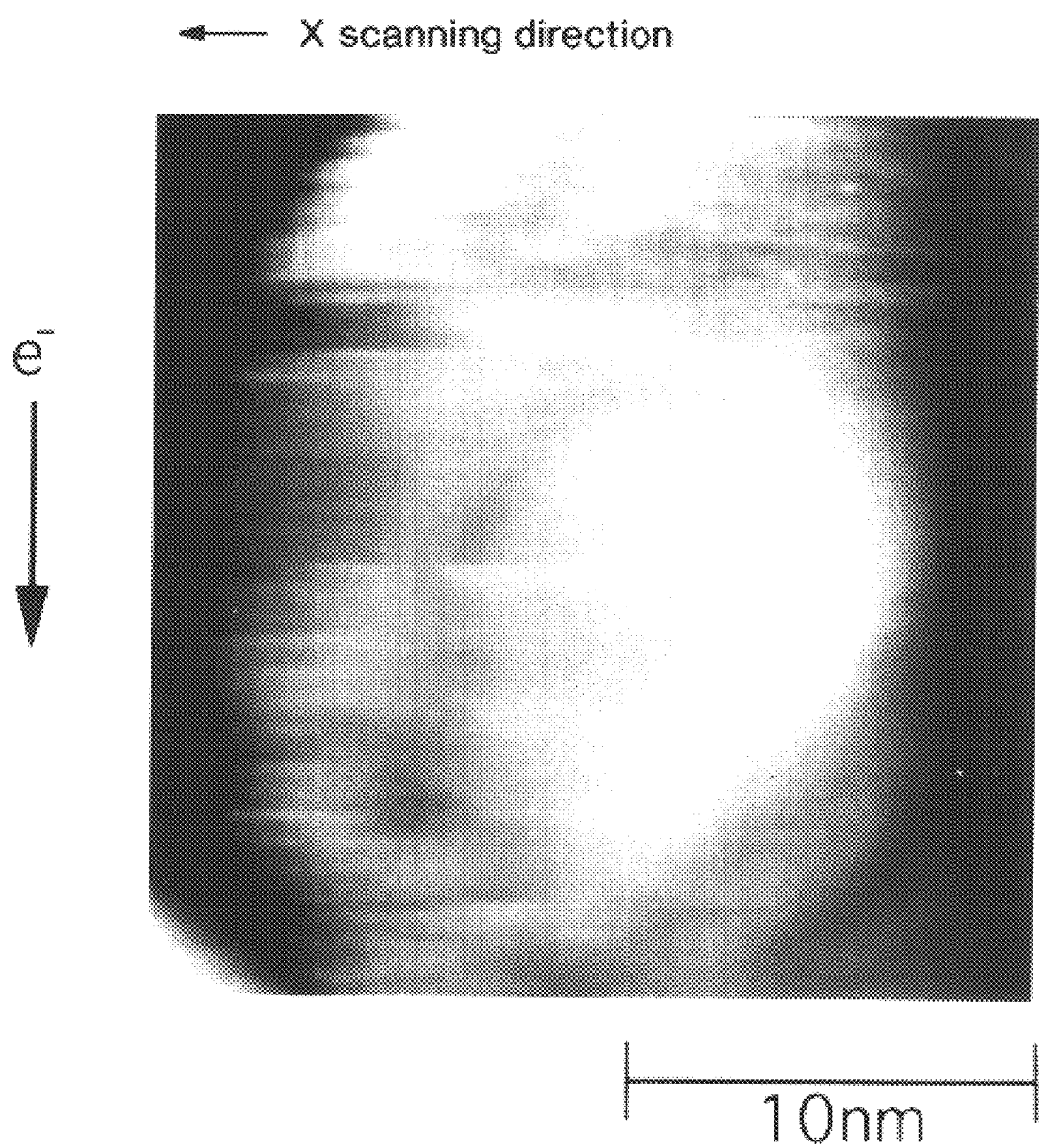
FIG. 7 is a STM image which is obtained by scanning the specimen as to obtain 256 observing points to X direction and 256 observing points to Y direction.
Figure 8:
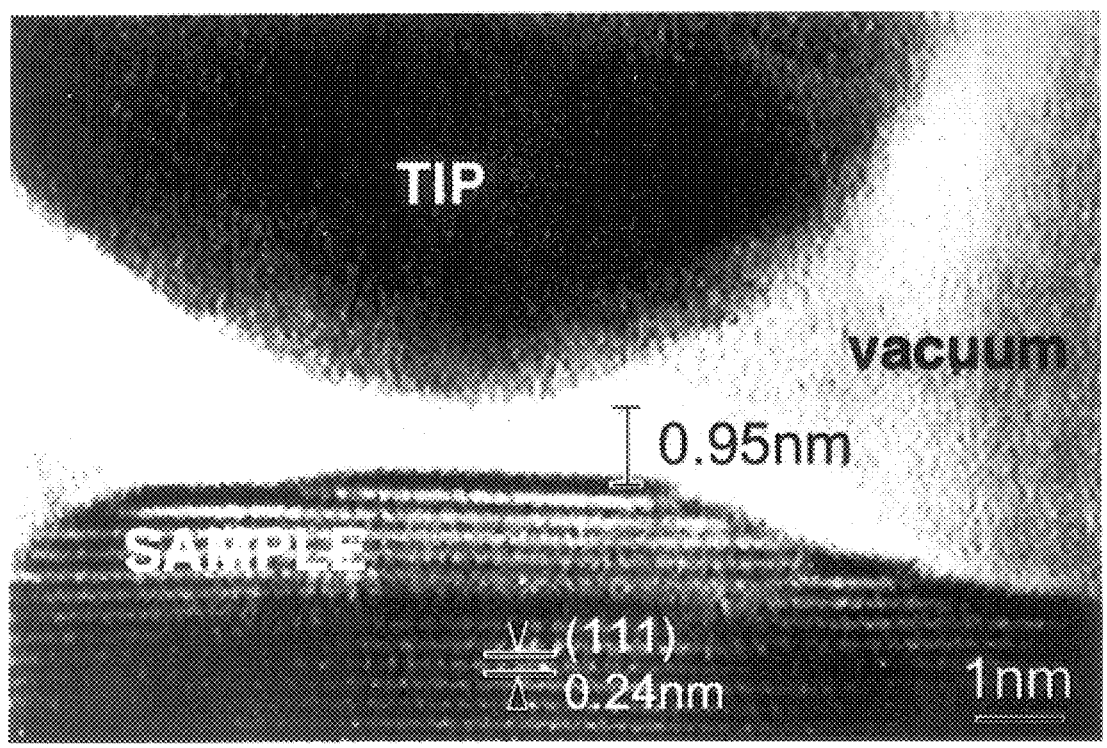
FIG. 8 is a picture of electron microscope image of the specimen just before the STM. observation of FIG. 7 observed by probe 12 of STM
Figure 9A:
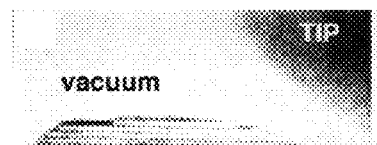
FIG. 9 is an electron microscope observation picture of the probe scanning to X direction.
Figure 9B:
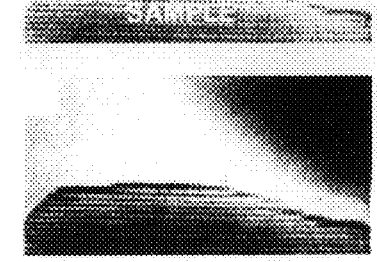
Figure 9C:
Figure 9D:
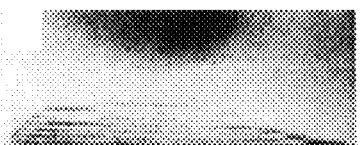
Figure 9E:
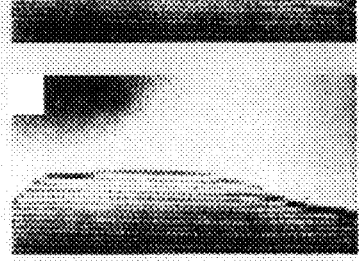
Figure 9F:
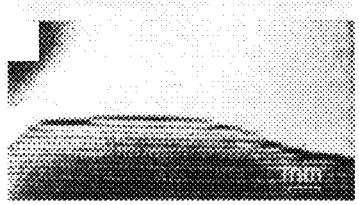

Further, an observation electron beam (200 KV) by electron microscope is radiated to said specimen simultaneously with observation of said STM and the electron beam that have passed through the specimen is picked out on a fluorescent screen (not shown in drawings) and observed. The state of said phenomenon is illustrated in FIG. 6-1 and FIG. 6-2 which is a partial enlarged view of FIG. 6-1. The spearhead of probe 12 of STM is closed to the observing position for the specimen which is the vacuum evaporated striped grown gold and an observation electron beam $e^-$ by electron microscope is radiated and passed though the specimen and picked out on a fluorescent screen. Simultaneously, the state of probe 12 of STM can be observed by said electron beam. FIG. 7 is a STM image which is obtained by scanning the specimen as to obtain 256 observing points to X direction and 256 observing points to Y direction. Said STM image is obtained by charging bias voltage of –0.05 V, scanning probe 12 so as to make flow a constant tunneling current of 1 nA, that is, obtained by scanning probe 12 keeping the distance between probe 12 and specimen surface constant, and can be said as the surface observation image of the specimen. FIG. 8 is a picture of electron microscope image of the specimen just before the STM observation of FIG. 7 observed by probe 12 of STM by feeding back the scanning observing condition by a tunneling current to control the observing condition to said scanning observing condition (Vs=–0.05V, probe tunneling current=1 nA). In this picture TIP is a spearhead of the probe. And, FIG. 9 is a picture of electron microscope image of one direction of FIG. 7 which observes the motion of probe scanning for instance to X direction, while (a) is a picture of just after scanning and 6 specimens are sampled by every 0.2 seconds.

Since the microscopic system of this invention is possible to vacuum each chamber to ultra high vacuum level independently, it is possible to select the best cleaning up condition fitted to a specimen and to a probe, and also possible to change a specimen and a probe maintaining the ultra high vacuum condition of other chamber, especially electron microscope chamber 9. Further, a specimen and a probe are not exposed to the atmosphere at an unnecessary case.

What is claimed is:

1. A microscope system which allows the simultaneous observation of a specimen under ultrahigh vacuum conditions by a transmission type electron microscope and by a scanning tunneling microscope, comprising a specimen treating chamber for and cleaning, by ultrahigh vacuuming, said specimen to be observed, comprising a specimen holder for holding said specimen, a first ultrahigh vacuum chanter for storing and cleaning a scanning tunneling microscope, comprising a holder for said scanning tunneling microscope, a second ultrahigh vacuum electron microscope chamber comprising an observation stage for microscopically viewing said specimen, while fixed by said specimen holder, by electron beam irradiation and simultaneously by said scanning tunneling microscope, a first gate valve connecting said specimen treating chamber to said second chamber, a second gate valve connecting said first chamber to said second chamber, a first transfer rod for transferring the scanning tunneling microscope between the first chamber and the observation stage in said second chamber via said first valve, a second transfer rod for transferring the specimen while fixed to the specimen holder between the specimen treating chamber and the observation stage in said second chamber via second valve), whereby, during use of the microscope system the scanning tunneling microscope is cleaned by ultrahigh vacuuming in the first chamber and the specimen is cleaned by ultrahigh vacuuming in the specimen treating chamber, each independently of the other, and whereby the cleaned scanning tunneling microscope and the cleaned specimen are independently transferred by said first and second transfer rods, respectively, to and from the observation stage in the ultra high vacuum electron microscope chamber.

2. The microscope system of claim 1, wherein said first transfer rod comprises means for securely holding the scanning tunneling microscope holder, during transfer thereof between said first and second chambers, and wherein said second transfer rod comprises means for securely holding the specimen holder during transfer thereof between said first and second chambers.

3. A microscope system which allows the simultaneous observation of a specimen under ultrahigh vacuum conditions by a transmission type electron microscope and by a scanning tunneling microscope, comprising a specimen treating chamber for storing said specimen to be observed, comprising a specimen holder for holding said specimen, a first ultrahigh vacuum chamber for storing a scanning tunneling microscope, comprising a holder for said scanning tunneling microscope, a second ultrahigh vacuum electron microscope chamber comprising an observation stage for microscopically viewing said specimen, while fixed by said specimen holder, by electron beam irradiation and simultaneously by said scanning tunneling microscope, a first gate valve connecting said specimen treating chamber to said second chamber, a second gate valve connecting said first chamber to said second chamber, a first transfer rod for transferring the scanning tunneling microscope between the first chamber and the observation stage in said second chamber via said first valve, a second transfer rod for transferring the specimen while fixed to the specimen holder between the specimen treating chamber and the observation stage in said second chamber via second valve, whereby the scanning tunneling microscope and the specimen are independently transferred by said first and second transfer rods, respectively, to and from the observation stage in the ultrahigh vacuum electron microscope chamber.

* * * * *